US006277774B1

(12) United States Patent
Xiao et al.

(10) Patent No.: US 6,277,774 B1
(45) Date of Patent: Aug. 21, 2001

(54) GRAIN GROWTH INHIBITOR FOR SUPERFINE MATERIALS

(75) Inventors: Danny T. Xiao, Willington; Chris W. Strock, Storrs; Donald M. Wang, Storrs; Peter R. Strutt, Storrs, all of CT (US)

(73) Assignee: Inframat Corporation, North Haven, CT (US)

( * ) Notice: Subject to any disclaimer, the term of this patent is extended or adjusted under 35 U.S.C. 154(b) by 0 days.

(21) Appl. No.: 09/138,137

(22) Filed: Aug. 21, 1998

Related U.S. Application Data
(60) Provisional application No. 60/057,339, filed on Aug. 22, 1997.

(51) Int. Cl.[7] .................................................. C04B 35/56
(52) U.S. Cl. .............................. 501/12; 501/87; 501/92; 501/96.1; 501/96.2; 501/96.4; 75/240; 75/242; 75/244
(58) Field of Search ................................ 264/12; 501/12, 501/87, 92, 96.1, 96.2, 96.4; 75/240, 242, 244; 427/421

(56) References Cited

U.S. PATENT DOCUMENTS

| | | | |
|---|---|---|---|
| 4,248,814 | 2/1981 | Yajima et al. . | |
| 4,336,215 | 6/1982 | Yajima et al. . | |
| 4,556,526 | 12/1985 | Yajima et al. . | |
| 4,590,034 | * 5/1986 | Hirano et al. | 501/96.4 |
| 4,713,123 | 12/1987 | Inokuti et al. . | |
| 4,757,035 | * 7/1988 | Barney et al. | 501/88 |
| 4,851,041 | * 7/1989 | Polizzotti et al. | 75/240 |
| 4,904,424 | * 2/1990 | Johnson | 264/29.2 |
| 4,945,072 | * 7/1990 | Burns et al. | 501/96.2 |
| 4,988,646 | * 1/1991 | Mukherjee | 501/96.2 |
| 5,006,492 | * 4/1991 | Sumen et al. | 501/96.2 |
| 5,010,045 | * 4/1991 | Maya | 501/96.4 |
| 5,080,844 | * 1/1992 | Su | 264/63 |
| 5,112,779 | * 5/1992 | Burns et al. | 501/96.2 |
| 5,208,192 | * 5/1993 | Yu et al. | 501/96.2 |
| 5,230,729 | * 7/1993 | McCandlish et al. | 75/351 |
| 5,258,224 | * 11/1993 | Langlois, Jr. et al. | 428/325 |
| 5,332,701 | * 7/1994 | Bryson et al. | 501/87 |
| 5,350,719 | * 9/1994 | Narula et al. | 501/96.2 |
| 5,431,967 | * 7/1995 | Manthiram et al. | 427/555 |
| 5,449,646 | * 9/1995 | Zank | 501/96.2 |
| 5,632,941 | 5/1997 | Mehrotra et al. . | |

FOREIGN PATENT DOCUMENTS

| | | |
|---|---|---|
| 38 34 325 | 4/1990 | (DE) . |
| 0 375 148 | 6/1990 | (EP) . |

OTHER PUBLICATIONS

S. Berger et al, "Nanocrystalline Materials: A Study of WC–Based Hard Metals", *Progress in Materials Science*, vol. 42, pp. 311–320, 1997.
A. Bock et al, "Powder Metallurgy", *PMI*, Vo. 24, No. 1, pp. 20–26, 1992.
B.K. Kim et al, "Structure and Properties of Nanophase WC/Co/VC/TaC Hardmetal", *Nanostructured Materials*, vol. 9, pp. 233–236, 1997.
H. E. Grenoble, "The Role Solutes in the Secondary Recrystallization of Silicon Iron", *IEEE Transactions on Magnetics*, vol. MAG–13, No .5, pp. 1427–1433, Sep. 1977.
Tongsan D. Xiao et al, "Synthesis of Aluminum Nitride/Boron Nitride Composite Materials", *J. Am. Ceram, Soc.*, vol. 76, No. 4, pp. 987–992, 1993.

* cited by examiner

*Primary Examiner*—Paul Marcantoni
(74) *Attorney, Agent, or Firm*—Cantor Colburn LLP

(57) ABSTRACT

A method comprising incorporation of an inorganic polymer precursor of a grain growth inhibitor into superfine materials or intermediates useful for the production of superfine materials. The precursor/nanostructured material composite is optionally heat treated at a temperature below the grain growth temperature of the superfine material in order to more effectively disperse the precursor. The composites are then heat treated at a temperature effective to decompose the precursor and to form superfine materials having grain growth inhibitors uniformly distributed at the grain boundaries. Synthesis of the inorganic polymer solution comprises forming an inorganic polymer from a solution of metal salts, filtering the polymer, and drying. Alloying additives as well as grain growth inhibitors may be incorporated into the superfine materials.

53 Claims, 5 Drawing Sheets

GRAIN GROWTH INHIBITOR FOR SUPERFINE MATERIALS

CROSS-REFERENCE TO RELATED APPLICATION

This application claims priority to provisional U.S. patent application Ser. No. 60/057,339, filed Aug. 22, 1997, which is incorporated herein by reference in its entirety.

BACKGROUND OF THE INVENTION

1. Field of the Invention

This invention generally relates to methods for the synthesis of superfine materials having particle or gain dimensions larger than 100 nm and less than or equal to about 10 microns. In particular, this invention relates to chemical methods for the introduction of a grain growth inhibitor and/or alloy additions into superfine materials, resulting in materials having controlled microstructure and morphology. The obtained materials exhibit superior properties, including improved fracture toughness, hardness, and wear-, corrosion-, and erosion-resistance.

2. Brief Description of the Prior Art

For decades, materials with fine-scale microstructures have been recognized to exhibit unusual and technologically attractive properties. Currently, interest is growing in classes of materials composed of very fine grains or particles having dimensions in the range of less than or equal to 100 nanometers (nm), known as "nanostructured" materials; materials composed of grains or particles having dimension in the range of greater than 100 nm and less than or equal to 1 micron, known as "ultrafine" materials; and a class of materials having dimensions between about 1 micron and about 10 microns. As used hereinafter, "superfine" materials will refer collectively to materials having dimensions of greater than 100 nm and less than or equal to about 10 microns. A feature of superfine materials is the high fraction of atoms that reside at grain or particle boundaries compared to larger materials. Nanostructured and superfine materials may thus have substantially different, often superior chemical and physical properties compared to conventional, large-sized counterparts having the same composition. Thus considerable advantages accrue from the substitution of nanostructured and superfine materials for conventional large-structured materials in a wide range of applications, for example superior strength, improved fracture toughness and hardness in martensitic steels, and reduced sintering temperature for consolidation and the onset of superplasticity in ceramics. Nanostructured and superfine metal alloys and metal carbides, in particular, are expected to have superior properties, including improved fracture toughness, hardness, and wear-, corrosion-, and erosion-resistance. The ability to synthesize and optimize the pore structure and packing density of nanostructured and superfine materials at the atomic level is a powerful tool for obtaining new classes of these materials. These new classes, together with designed multifunctional coatings, present unprecedented opportunities for advances in material properties and performance for a broad range of engineering applications.

Inframat Corp. has made significant progress in the field of nanostructured and superfine materials, including in the synthesis of nanostructured metal powders by the organic solution reaction (OSR) method, aqueous solution reaction (ASR) method, and in advanced chemical processing of oxides and hydroxides materials for structural, battery and fuel cell applications. Examples of materials produced from these methods include nanostructured alloys of Ni/Cr, nanostructured NiCr/$Cr_3C_2$ composites, nanostructured yttria-stabilized $ZrO_2$, nanofibrous $MnO_2$, and $Ni(OH)_2$. Inframat has further developed technologies for manufacturing nanostructured and ultrafine materials in bulk quantities as disclosed in "Nanostructured Oxide and Hydroxide Materials and Methods of Synthesis Therefor," which is the subject of pending U.S. and foreign applications (including U.S. Ser. No. 08/971, filed Nov. 17, 1997), as well as technologies for the thermal spray of nanostructured and ultrafine feeds including nanostructured WC—Co composites, as disclosed in "Nanostructured Feeds for Thermal Spray Systems, Method of Manufacture, and Coating Formed Therefrom" also the subject of pending U.S. and foreign patent applications (including U.S. Ser. No. 09/019,061, filed Feb. 5, 1998), both U.S. patent applications being incorporated herein in their entirety. Chemical syntheses of nanostructured metals, ceramics, and composites using OSR and ASR methods have also been previously described by Xiao and Strutt in "Nanostructured Metals, Metal Alloys, Metal Carbides and Metal Alloy Carbides and Chemical Synthesis Thereof," U.S. Ser. No. 08/989,000, filed Dec. 5, 1996, incorporated herein by reference, as well as in "Synthesis and Processing of Nanostructured Ni/Cr and Ni—$Cr_3C_2$ Via an Organic Solution Method," Nanostructured Mater. Vol. 7 (1996) pp. 857–871 and in "Synthesis of Si(C,N) Nanostructured Powders From an Organometallic Aerosol Using a Hot-Wax Reactor," J. Mater. Sci. Vol. 28 (1993), pp. 1334–1340.

The OSR and ASR methods employ a step-wise process generally comprising (1) preparation of an organic (OSR) or aqueous (ASR) solution of mixed metal halides; (2) reaction of the reactants via spray atomization to produce a nanostructured precipitate; and (3) washing and filtering of the precipitate. The precipitate is often then heat treated, and/or subjected to gas phase carburization under either controlled carbon/oxygen activity conditions (to form the desired dispersion of carbide phases in a metallic matrix phase), or under controlled nitrogen/hydrogen activity conditions to form nanostructured nitrides. This procedure has been used to synthesize various nanostructured compositions, including nanostructured NiCr/$Cr_3C_2$ powders for use in thermal spraying of corrosion resistant hard coatings. An advanced chemical processing method combines the ASR and OSR methods with spray atomization and ultrasonic agitation.

Another approach to the synthesis of nanostructured materials is the inert gas condensation (IGC) method. As described in "Materials with Ultrafine Microstructures: Retrospective and Perspectives", Nanostructured Materials Vol. 1, pp. 1–19, Gleiter originally used this method to produce nanostructured metal and ceramics clusters. The method was later extensively used by Siegel to produce nanostructured $TiO_2$ and other systems, as described in "Creating Nanophase Materials", Scientific American Vol. 275 (1996), pp.74–79. This method is the most versatile process in use today for synthesizing experimental quantities of nanostructured metals and ceramic powders. The IGC method uses an evaporative sources of metals, which are then convectively transported and collected on a cold substrate. Ceramic particles must be obtained by initially vaporizing the metal source, followed by a slow oxidation process. A feature of this method is the ability to generate loosely agglomerated nanostructured powders, which are sinterable at low temperatures.

One other method for the synthesis of nanostructured materials is chemical vapor condensation (CVC). CVC is described by Kear et al. in "Chemical Vapor Synthesis of Nanostructured Ceramics" in Molecularly Designed Ultra fine/Nanostructured Materials in MRS Symp. Proc. Vol. 351 (1994), pp. 363–368. In CVC, the reaction vessel is similar to that used the IGC method, but instead of using an evaporative source, a hot-wall tubular reactor is used to decompose a precursor/carrier gas to form a continuous stream of clusters of nanoparticles exiting the reactor tube. These clusters are then rapidly expanded out to the main reaction chamber, and collected on a liquid nitrogen cooled substrate. The CVC method has been used primarily with chemical precursors or commercially available precursors. Kear describes the production of nanostructured $SiC_xN_y$ and oxides from hexamethyldisilazane.

Finally, a thermochemical conversion method for producing nanostructured WC—Co has been disclosed by Kear in "Synthesis and Processing of Nanophase WC—Co Composite" Mater. Sci. Techn. Vol. 6 (1990), p. 953. In this method, aqueous solutions containing tungsten and cobalt precursors are spray-dried to form an intermediate precursor at temperatures of about 150 to 300° C. This intermediate precursor is a mixture of amorphous tungsten oxide and cobalt in the form of a spherical hollow shell having a diameter of about 50 microns and a wall thickness of about 10 microns. Nanostructured WC—Co is then obtained by the carburization of this precursor powder at 800–900° C. in a carbon monoxide/carbon dioxide mixture. The synthesis of nanostructured WC/Co using this technique has described in several patents by McCandlish et al., including "Multiphase Composite Particle," U.S. Pat. No. 4,851,041, and "Carbothermic Reaction Process for Making Nanophase WC—Co," U.S. Pat. No. 5,230,729. Synthesis of nanostructured and superfine WC/Co is of particular interest to industry, as is it is presently the material of choice for cutting tool, drill bit, and wear applications.

It is expected that a number of the techniques developed especially for nanostructured materials are also applicable to synthesis of superfine materials, through controlled manipulation of grain size either at the synthetic level or through the use of grain growth inhibitors. However, a major drawback of the above-described techniques, as well as for other techniques for the synthesis of superfine materials known in the art, is the tendency of the produced materials to undergo uncontrolled grain growth during sintering or use of the nanostructured component, especially at high temperature. For example, the tungsten carbide grains of as-synthesized nanostructured WC—Co have diameters of about 30 nm. During liquid phase sintering, the tungsten carbide grains grow rapidly to diameters of several microns or larger in a relatively short time, e.g., a few minutes. After exhaustive research and engineering evaluations it has been concluded that VC and/or $Cr_3C_2$ are the most effective carbide phases of the very large range of materials evaluated over the years.

Vanadium carbide, for example, has been employed by Nanodyne, Inc. (Brunswick, N.J.) to prevent this disadvantageous grain growth, as described in Nanodyne's product specification for the product sold under the tradename Nanocarb®. In this process, micron-sized vanadium carbide powders are blended into the WC/Co powder composite via mechanical mixing, followed by shape-formation and sintering into bulk components. The use of vanadium carbide is effective to prevent some degree of grain growth, as the final grain size of the consolidated bulk piece is in the sub-micron range, e.g., 0.2–0.8 microns. The major drawback of this grain growth technique is the non-homogeneous mixing of the VC within the WC/Co composite materials as well as the difficulty of sintering kinetics, resulting in non-homogeneous bulk material properties, or increased cost for sintering procedure.

In an attempt to solve the above problem, Nanodyne currently employs a chemical precipitation technique in which a vanadium salt is introduced chemically at the start of the materials synthesis. Although use of this technique overcomes the problem of non-homogeneous mixing, it produces vanadium oxide instead of vanadium carbide. It is well known that any oxide material that presented in the WC/Co system is detrimental to the material. The introduction of vanadium oxide into the WC/Co system not only creates sintering difficulties, but also requires an extra carbon source in the WC/Co powder for the conversion of vanadium oxide into vanadium carbide at extremely high temperatures, e.g., 1450° C. In many cases the extra carbon source embrittles the consolidated materials.

Prior incorporation of boron compounds into fine-grained materials has been described in "Synthesis of AlN/BN Composite Materials" by Xiao and Strutt, in J. Am. Ceram. Soc., Vol. 76, p. 987 (1993), which discloses synthesis from a composite precursor comprising aluminum, boron, and nitrogen. The boron nitride polymer is formed by bubbling ammonia into an aqueous solution of boric acid and urea.

Scoville et al., in "Molecularly Designed Ultrafine/ Nanostructured Materials", ed. by K. E. Gonsalves, D. M. Chow, T. D. Xiao, and R. Cammarato, MRS Symp. Vol. 351, p. 431 (1994) describe a method for incorporation of BN nanostructured particles into a germanium crystal lattice to significantly reduce thermal conductivity. In this method, micron-sized BN and Si/Ge powders are blended together and evaporated using a plasma torch to form mixtures, which are then condensed into a composite of BN/Si/Ge. Heat treatment results in large crystals (>1 micron) of Si/Ge wherein discrete 2–10 nm BN grains are trapped inside the large crystals.

Boron nitride has also been incorporated into a conventional (larger than 100 nm grain size) titanium diboride system with WC/Co additives as disclosed in U.S. Pat. No. 5,632,941 to Mehrotra et al. BN is incorporated in the form of a powder. U.S. Pat. No. 4,713,123 further disclose use of BN as a grain growth inhibitor in conventional (larger than 100 nm grain size) silicon steel. However, when the quantity of BN is too large, it is becomes difficult to grow the secondary recrystallized grain with {110}<001>orientation, so that the amount is limited to a range of 0.0003–0.02%.

Addition of boron to silicon steel in the form of ferroboron, followed by nitridation of the steel to provide nitrogen results in the formation of slight amounts of boron or BN, which may inhibit grain boundary migration, as reported by Grenoble in IEEE Trans. Mag., May 13th, p. 1427 (1977), and Fiedler in IEEE Trans. Mag. May 13th p. 1433 (1977). None of these references disclose use of a BN polymer as a grain growth inhibitor precursor.

Accordingly, there remains a need in the art for methods of inhibiting and/or controlling grain growth during the processing of as-synthesized nanostructured and superfine materials and nanostructured and superfine material intermediates, especially a method applicable to a wide range of compositions.

SUMMARY OF THE INVENTION

The above discussed and other drawbacks and deficiencies of the prior art are overcome or alleviated by the method of the present invention, comprising incorporation of a polymer precursor of a grain growth inhibitor into superfine materials or intermediates useful for the production of superfine materials. The precursor/nanostructured (or superfine) material composite is optionally heat treated at a temperature below the grain growth temperature of the material in order to more effectively disperse the precursor. The composites are then heat treated at a temperature effective to decompose the precursor, thereby forming materials having grain growth inhibitors uniformly distributed therein, preferably onto the grain boundaries. Synthesis of a preferred inorganic polymer solution comprises forming an inorganic polymer from a solution of metal salts, filtering the polymer, and drying.

In a first embodiment of the present invention, the inorganic polymer precursor is introduced into the superfine material in the powder production step, i.e., during the synthesis of the material or an intermediate leading to the product material, and then converted by heat treatment to the grain growth inhibition species, thus allowing the grain growth species to be homogeneously mixed with the material at the molecular level. Such heat treatment may also be used to convert an intermediate superfine material into the product superfine material.

In a second embodiment, the polymeric precursor is incorporated into an already-synthesized superfine material or intermediate. In one method, the polymer precursor is dissolved into a solvent containing a dispersion of already-synthesized particles and the resultant slurry is oven-dried or spray-dried to form a dried powder having the grain growth inhibitor uniformly distributed within the grain boundaries of the superfine particles. Alternatively, already-synthesized particles are coated with the polymer precursor and optionally heat treated at a temperature lower than the grain growth temperature, thereby melting and diffusing precursor through any matrix and to the grain boundaries. The oven-dried, spray-dried or coated particles/precursor composites are then heat treated if necessary to convert the polymer precursor to grain growth inhibitor, and optionally further processed (e.g., by nitridation or carburization) to produce product materials having grain growth inhibitors uniformly distributed at the grain boundaries. This methodology is capable of substantially coating each particle with a grain growth inhibitor barrier, or of obtaining homogeneous mixing of the grain growth inhibitor with the nanoparticles at the nanometer level.

In still another embodiment of the invention, alloying additives and/or grain growth inhibitors are incorporated into the materials. The alloying additives and/or grain growth inhibitor precursor may be incorporated into the reaction mixture used to synthesize the material as described in the above first embodiment, or the alloying additives precursor may be incorporated into the as-synthesized material as described in the above second embodiment. The as-synthesized material may comprise grain growth inhibitor or precursor incorporated at the synthesis stage. Alternatively, the alloying additive is combined with the polymeric grain growth inhibitor precursor and then incorporated into the already-synthesized particles. Mixing, e.g., by ball-milling to form a homogeneous mixture of the particles with the alloying additives and the grain growth inhibitor precursor is followed by spray drying or oven-drying and processing as described above for the second embodiment.

An especially advantageous feature of the present method is its applicability to a wide variety of materials systems, including metals, metal alloys, carbides, nitrides, intermetallics, ceramics, and their combinations. Preferably, the grain growth inhibitor itself is a high performance material, exhibiting excellent mechanical and other physical and chemical properties. Addition of alloying additives further improves the properties of the product materials, including hardness, toughness, density, corrosion- and erosion-resistance. The present invention allows the economical, large-scale fabrication of high performance superfine materials having a wide range of compositions for targeted applications.

DETAILED DESCRIPTION OF THE INVENTION

Figure 1:
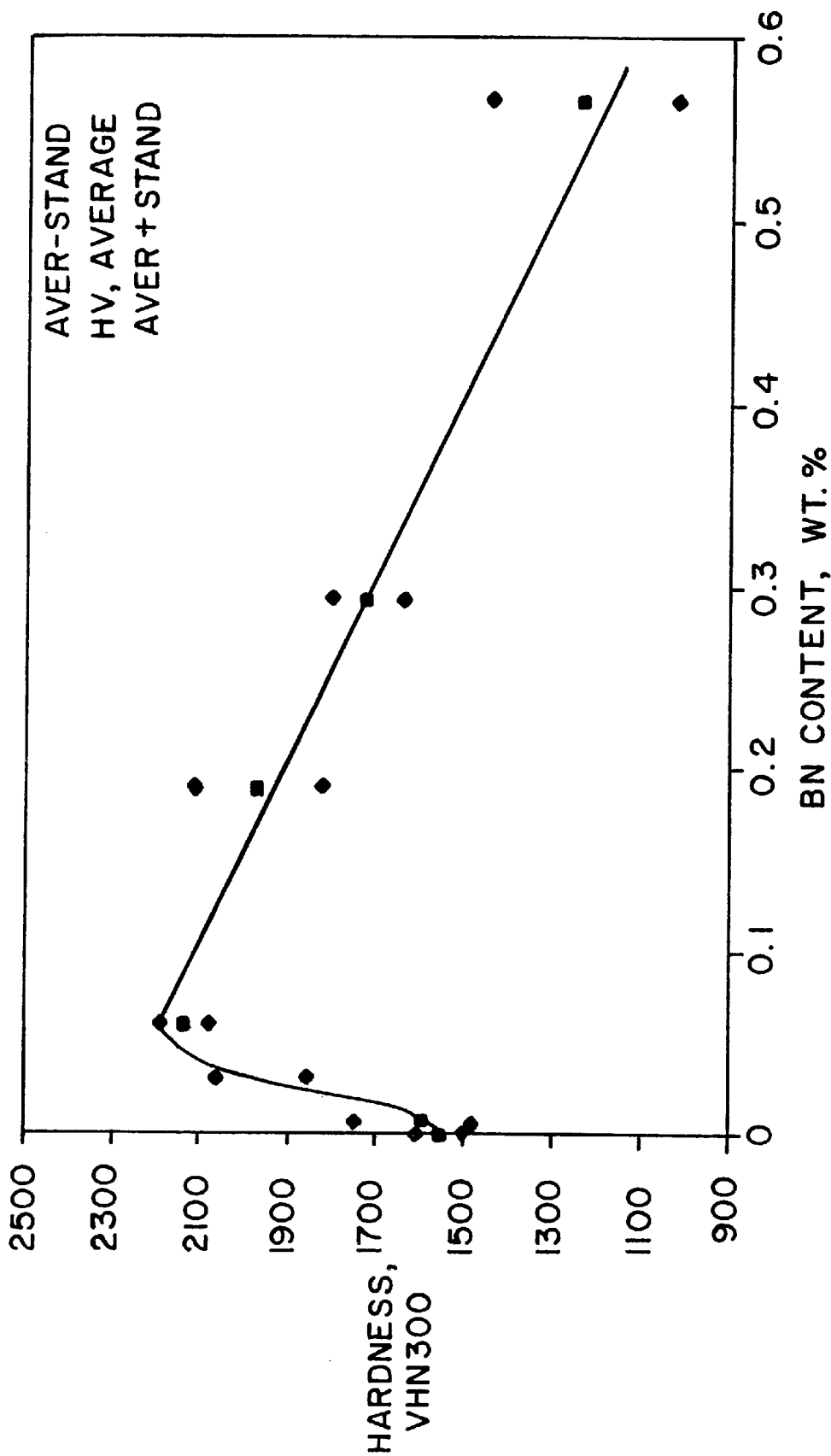
FIG. 1 is a graph illustrating the effect of increasing amounts (weight %) of BN on hardness of a WC—Co nanostructured composite material.
Figure 2A:
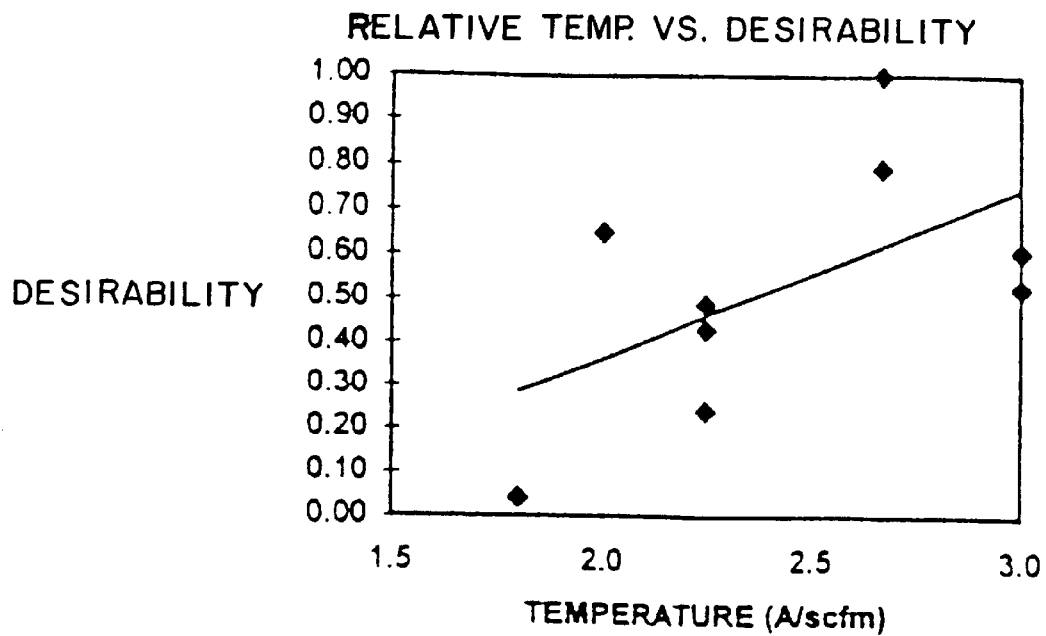
FIG. 2 shows the Vicker's hardness data of the samples from the thermal spray trials.
Figure 2B:
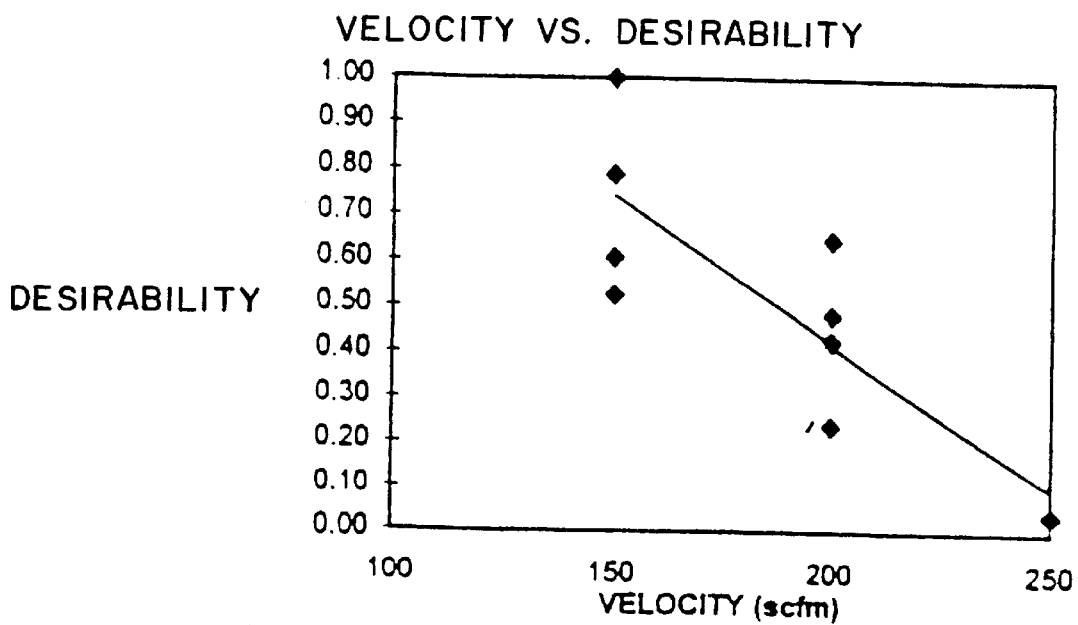
Figure 2C:
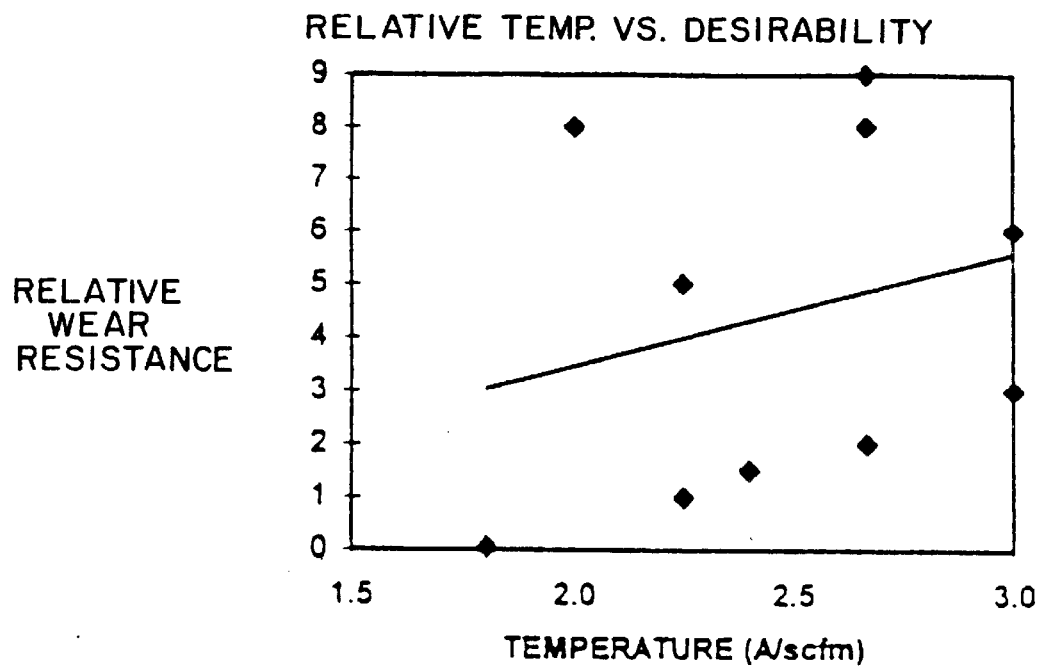
Figure 2D:
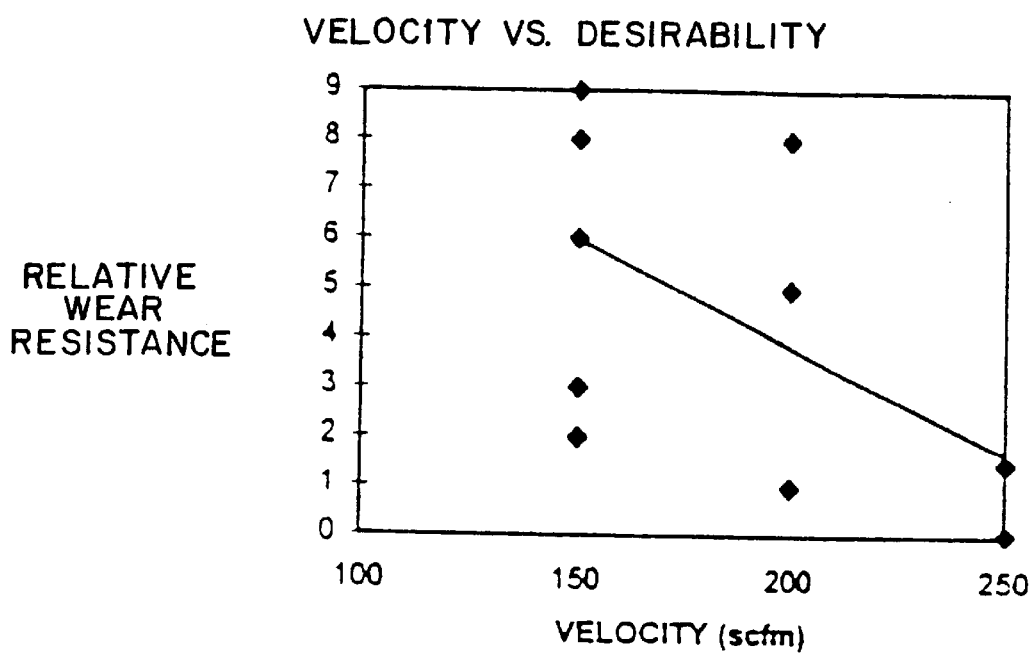
Figure 2E:
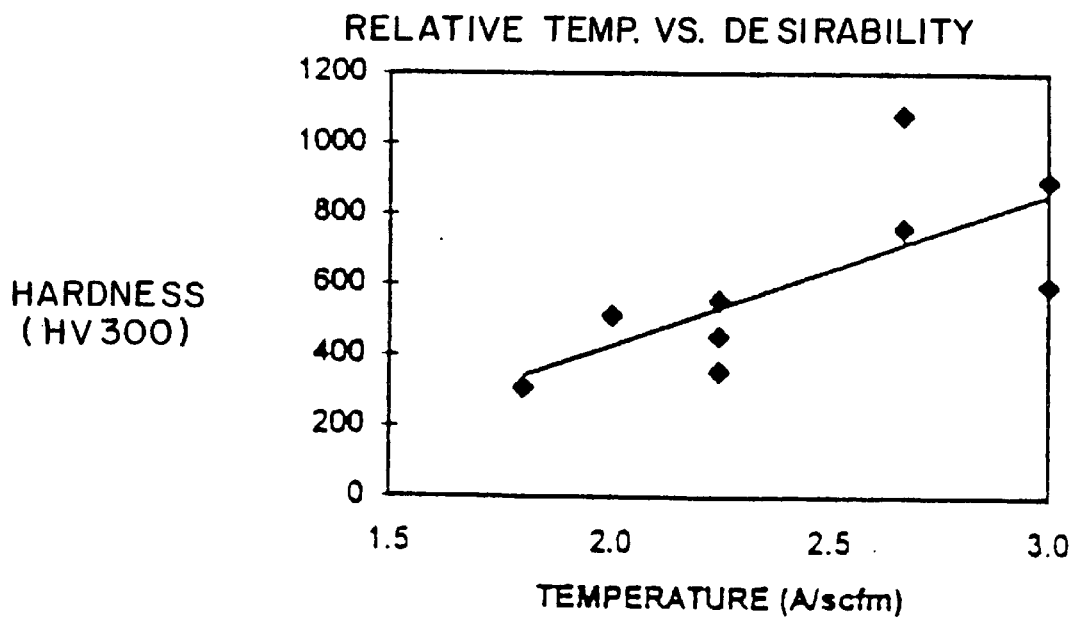
Figure 2F:
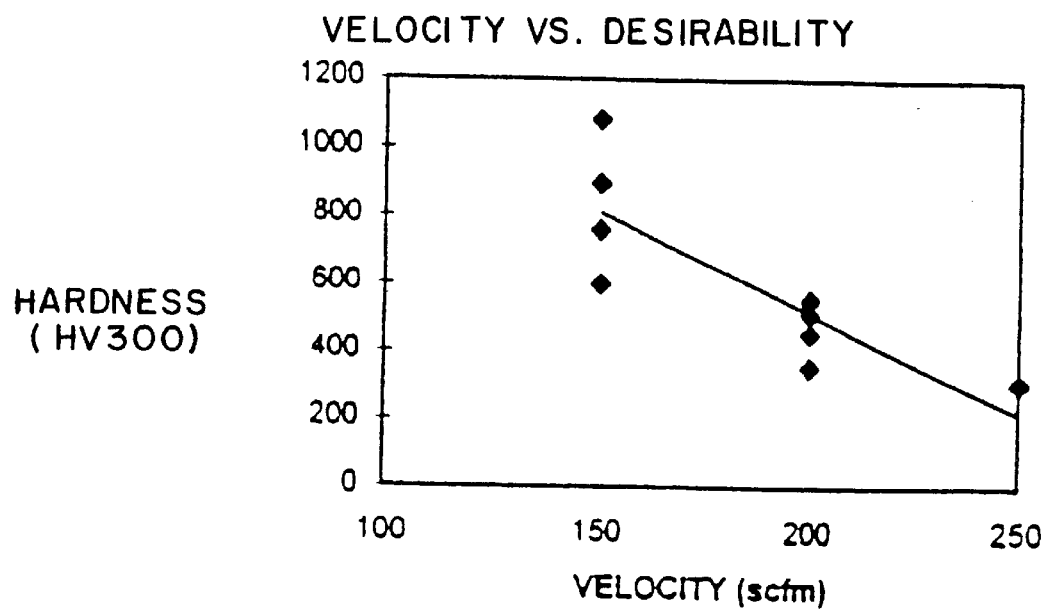

The methods of the present invention are particularly useful for incorporation of grain growth inhibitors and/or alloying additives into superfine materials (materials having grain sizes greater than 100 nm and less than or equal to about 10 microns). Accordingly, the present invention is directed to a method for the inhibition of grain growth during processing of powder materials, comprising incorporation of a grain growth inhibitor polymer precursor into superfine materials or intermediates useful for the production of superfine materials for bulk and coating applications. The polymer precursor and/or alloying additive is incorporated into the superfine material or intermediate either as the material is synthesized, or after synthesis (preferably at the as-synthesized intermediate stage). Incorporation of the polymer precursor and optional alloying additive as the material is synthesized is preferable, as the number of processing steps is reduced, the method is more cost-effective, and it is more likely that the grain growth inhibitor is uniformly distributed. The present invention therefore provides a method for fabricating superfine materials with controlled morphology, microstructure, and chemical composition. The material obtained can be used as feed stocks for superfine coatings as well as in advanced, high performance bulk applications.

Without being bound by theory, it is hypothesized that the surprisingly good results obtained by the present invention arise from effective distribution of the grain growth inhibitor substantially onto the grain boundaries, as such distribution minimizes grain growth due to the difficult diffusion path for atoms across the grain boundaries. With reference to the BN grain growth inhibitor in the WC/Co system in particular, cluster stabilization in the cobalt-rich melt by the presence of a high concentration of metal/non-metal binding pairs may be an important factor, since it inhibits liquid phase transport of tungsten and carbon from one WC grain to the next adjacent grain. Upon addition of BN to the Co melt BN may pass into solution in the liquid Co; under these circumstances the melt, which is already rich in tungsten and carbon in the case of nanophase material, would become further enriched in boron and nitrogen, so that the potential for cluster stabilization is enhanced. With the addition of alloying additives such as Cr, Si, and the like, the complexity of the melt increases, giving rise to the so-called "confusion" principle, which determines the susceptibility of t a liquid melt to amorphization. Boron is a well-known melt depressant of transition elements, and Allied Signal's MET-GLASS™ technology uses addition of boron to iron, nickel, and cobalt. In the present instance, boron may also be playing a role as a melt depressant, rendering the compacted material more susceptible to densification at low temperatures, as well as promoting amorphization during subsequent cooling. An alternative possibility is that nitrogen reacts with the WC interfaces to forma passivation film of $W_2N$ or a tungsten carbon nitride. In either case, the effect would be to inhibit coarsening due to the presence of the passivation film.

Superfine materials suitable for use in the present invention include metal, metal alloys, metal ceramics (especially metal carbides and metal nitrides), intermetallics, ceramics, or ceramic-ceramic composites. More particularly, preferred superfine materials are selected from the group consisting of Cu, FeCu, FeCo, NiAl, MoC, MoSi, NiCr, TiC, $Mo_2Si$, $NiCr/Cr_3C_2$, Fe/TiC, Ni/TiC, Mo/TiC, and WC/Co, the foregoing alloyed with one or more of Ti, Cr, Mo, Ni, Zr, Ce, Fe, Al, Si, V, TiC, Mn, Y, W, and mixtures of the foregoing metals, metal alloys, intermetallics, and metal ceramics. Sulfide-metal systems are excluded from the foregoing list.

Grain growth inhibitors suitable for use in the present invention are preferably chemically inert, amenable to uniform distribution onto or at the grain boundaries of the superfine material, and preferably add to, or at least do not detract substantially from, the chemical, physical, and mechanical properties desired in the superfine material. Importantly such inhibitors must also be available in a precursor form suitable for incorporation into superfine materials. A particularly important and advantageous feature of the present invention is that the grain growth inhibitors are incorporated into the superfine material in the form of a soluble, preferably water-soluble, polymeric precursor, or in the form of a low-melting polymer precursor. Use of a soluble precursor allows more homogenous distribution of the precursor (and thus grain growth inhibitor) throughout the superfine material. Use of a low-melting polymer precursor, i.,e., a precursor that melts a temperature below the grain growth temperature of the superfine material, also allows more homogenous distribution of the precursor throughout the superfine material. Of course, the precursor must be capable of subsequent conversion to the grain growth inhibitor upon treatment, preferably upon heat treatment.

Suitable grain growth inhibitors having the above characteristics may include, but are not limited to those known in the art, including metals, metal alloys, carbides, nitrides, intermetallics, and ceramics. Particular grain growth inhibitors include metals such as B, Si, Al, Cr, Ni, Mo, Hf, Ta, Fe, W, Zr and rare earth metals such as Ce, La and Sm; metal alloys such as the foregoing alloyed with, for example, Cr, Ti, and Mo; carbides such as silicon-based carbides and titanium-based carbides; nitrides such as aluminum-based nitrides, titanium-based nitrides, and BN; intermetallics, including metal silicides such as AlSi and TiSi, and metal aluminides such as TiAl; and other boron compounds such as titanium diboride. Boron compounds, and particularly boron nitride is presently preferred, due to its ready synthetic availability, its favorable distribution characteristics, its chemical inertness, and its superior chemical, physical, and mechanical properties.

Synthesis of a polymer precursor which will yield a grain growth inhibitor generally comprises forming an inorganic polymer from a solution of metal salts, filtering the polymer, and drying the polymer to obtain a dried polymer precursor. In the case of boron nitride, the appropriate stoichiometric ratio of boric acid and urea is dissolved in a solvent, preferably in water. A nitriding gas such as ammonia is then bubbled through the solution, making it strongly basic, until the metal precursor salts have been converted into an inorganic polymer precursor which will yield boron nitride upon heat treatment. The product is dried to yield a precursor polymer gel, which can be stored in the dry form.

A first embodiment of the present invention comprises the in-situ incorporation of the polymer precursor into the superfine products or superfine intermediates (usually a powder) as the superfine materials or intermediates are synthesized. Suitable synthesis techniques include but are not limited to those known in the art such as OSR, ASR, IGC, CVC, mechanical alloying, or other physical and chemical techniques. OSR and ASR techniques are presently preferred. In this embodiment, the polymer precursor is dissolved into a solvent, preferably water, containing the superfine material precursor(s) at controlled temperature in ratios selected as appropriate for the desired product. While dissolving the salts, the pH of the solution is controlled to prevent premature reaction of the salts.

The resulting solution is then spray-dried or oven dried, depending on the material's application, to form a solid, dried superfine powder product or intermediate. The spray drying process is generally a preferred process. Control of the spray-drying parameters allows formation of different powder morphologies, including spherical hollow shells and solid spheres of varying porosity and structure. During the drying process, the solution droplets reach elevated temperatures and become more concentrated as the solvent evaporates. Some or complete conversion of polymeric precursor to grain growth inhibitor may occur during spray-drying or oven-drying.

If required these dried powders are then treated, preferably heat treated, optionally under conditions of reduction and carburization or nitridation where required to produce the desired superfine product. The grain growth inhibitor precursor is partially or completely converted at this step to the grain growth inhibitor. Selection of appropriate carburization or nitridation conditions is well within the skill of those in the art, and requires the selection of an appropriate temperature and gas ratio with controlled C, O, or N activity in order to develop the desired particle size distribution, for example reduction of the oxide with ammonia/hydrogen gas at elevated temperature (e.g., 600–800° C.).

In a second embodiment of the present invention, the polymer precursor is incorporated into already-synthesized superfine materials or superfine intermediate materials. This embodiment comprises coating superfine particles (such as the subparticles of superfine WC/Co) with the polymeric precursor and heat treating the coated materials if necessary at a temperature lower than the grain growth temperature of the material, thereby resulting in diffusion of the polymeric precursor through any matrix of the material and onto the grain boundaries. The combined polymer precursor-nanostructured material or intermediate composite is then treated, preferably heat treated, under controlled gas conditions at elevated temperature in order to decompose the polymer precursor and to further diffuse the grain growth inhibitor to the grain boundaries.

In particular, the polymer precursor is either melted or dissolved directly onto the superfine material or intermediate, which is preferably in powder form. The polymer precursor is preferably dissolved in a solvent and added to either the superfine material or a slurry of the material. Where the particles are small enough or porous enough to allow sufficiently fine distribution of the polymer precursor throughout the material, a solution of appropriate concentration of precursor is used to wet the powder, and the resultant powder is simply air- or oven-dried onto the powder. Alteratively, the coated superfine particles are heat-treated for a time effective to disperse the polymer precursor into the superfine material or intermediate, at a temperature lower than the grain growth temperature of the superfine material.

Where the superfine particles are smaller than the desired final powder size, spray drying of a slurry of the polymer precursor and superfine material enhances diffusion and results hollow or solid spherical agglomerates having diameters in the range of 1–200 microns. Spray drying of the slurry results in the formation of a dried powder wherein the grain growth inhibitor is substantially uniformly distributed onto the grain boundaries of the superfine particles. The dried powder is in the form of solid spheres having diameters in the range of about 1 to 200 microns, each sphere comprising an assemblage of individual superfine particles.

Where necessary the coated material, whether spray-dried, oven-dried, or air-dried, is then treated, preferably heat treated in a controlled gas environment at elevated temperatures, to decompose the inhibitor precursor, and to further diffuse the inhibitor atoms through any matrix material (if present) onto the grain boundaries of the superfine particles. Carburization or nitridation may also occur at this step. Subsequent processing of the composite superfine powders in a controlled environment results in the formation of either bulk materials or coatings with superior properties.

In another embodiment of the present invention, at least one alloying additive is incorporated into the superfine material with or without incorporation of a grain growth inhibitor. The alloying additive can be any metallic or ceramic powder effective to alloy with the superfine material by the below-described or other process, and which does not significantly adversely affect the action of the grain growth inhibitor if present. Suitable alloying additives include, but are not limited to, Ti, Cr, Mo, Ni, Zr, Ce, Fe, Al, Si, V, TiC, Mn, Y, W, alloys of the foregoing, nitrides of the foregoing, and intermetallics of the foregoing.

The alloying additives may be introduced at virtually any point in the method of the present invention. Thus, alloying additives may be introduced into the reaction mixture used to synthesize the superfine material or superfine intermediate material, and if present, grain growth inhibitor precursor then incorporated either before (first embodiment above) or after (second embodiment above) synthesis of the superfine material or superfine intermediate material. The alloying additives may also be incorporated into the already-synthesized superfine material or superfine intermediate material, which synthesis also incorporates grain growth inhibitor precursor if present as described in the first embodiment above. Preferably the alloying additive and grain growth inhibitor precursor is incorporated into an as-synthesized superfine material or superfine intermediate material simultaneously.

One suitable method for this preferred method of incorporation is by ball milling the at least one alloying additive to obtain a more uniform powder mixture and then dispersing the alloying additive(s) into a solution containing the inorganic polymeric grain growth inhibitor, thereby forming a colloidal solution. The superfine material or superfine intermediate material is then mixed with the colloidal solution, and the resultant solution is spray-dried or oven-dried. The alloying additive(s) can also be introduced into the already-synthesized material or intermediate material by ball milling the alloying additive together with the superfine materials, followed by incorporation of the polymeric grain growth inhibitor as described above in connection with the second embodiment.

An apparatus suitable for the synthesis and introduction of a precursor into a superfine material includes a solution reaction vessel, ball milling apparatus or an ultrasonic processing system, a spray dryer, equipped with the usual and necessary accessories such as pH meter, temperature and gas flow controls, vacuum systems, as well as a high temperature carburization unit (fixed bed, moving bed, or fluidized bed reactor).

The carburization or nitridation equipment can be fixed bed reactors, fluidized bed reactors, and/or moving bed reactors. In the carburization, reactive gas such as $H_2$, $CO/CO_2$, $NH_3$, acetylene, $N_2$, Ar can be used. In a fluidized bed reactor, the solid particles are suspended by the fluidizing gas increasing the total volume and spacing the particles so that they are in constant motion, and are not continuously contacting one another. The particles are thus constantly exposed to the reactive gas, leading to much faster and efficient carburization process, and reduced agglomeration of the spray dried particles. An important advantage to using such a reactor is its ability to manufacture large batch quantities of powder for commercial use. From a production point of view, however, the moving bed reactor is the preferred reactor, because the moving bed reactor is suitable for a continuous production line, and may be more efficient in both energy consumption and gas consumption.

The invention is further illustrated by the following non-limiting examples.

EXAMPLE 1
Synthesis of a Grain Growth Inhibitor Polymer Precursor

Boric acid, $H_3BO_3$, and urea $(NH_2)_2CO$ (Aldrich Chemical Company, Milwaukee, Wis.) were used as received. Initially, 61.831 g (1 mol) of boric acid, and 63.784 g (1.062 mole) of urea were dissolved in 1 liter of deoxygenated water. After thorough mixing, the aqueous solution was slowly heated to 90° C. Ammonia was bubbled into the solution with vigorous stirring until the solution is strongly basic. After 4 hours of reaction, the water was removed by distillation, leaving as a residue the polymeric precursor in the form of an amorphous solid weighing approximately 80 grams. It is hypothesized that in the presence of ammonia, boric acid reacts with urea to form a poly-urea-boron complex. This boron nitride precursor is a gel-like white resin that is highly soluble in water, and which is readily ground into powder. Upon heating to a higher temperature in the presence of ammonia, the gel will initially melt at near 200° C., forming a foam-like glassy material, and upon continued heating at near 500–650° C. transform into BN in the form of a white powder.

EXAMPLE 2
Incorporation of BN into Nanostructured Materials

A known quantity of BN polymeric precursor synthesized as described in Example 1 was first dissolved in distilled, deionized water to make a nearly saturated solution. This solution was then combined with hollow shell nanostructured WC—Co (used as received from Nanodyne, Inc., New Brunswick, N.J.) and ball milled to produce a slurry. The milled slurry was then dried in an oven at about 100° C. to remove water. A number of samples were prepared wherein the molar percent of boron in the BN was 0.1%, 0.25%, 0.5%, 1%, 2%, 5%, and 10%. Converted to weight percent (wt. %), these values correspond to 0.006 wt. %, 0.015 wt. %, 0.03 wt. %, 0.06 wt. %, 0.119 wt. %, 0.293 wt. %, and 0.569 wt. % of boron in BN, respectively.

EXAMPLE 3
Sintering of Precursor/Nanostructured Material Intermediates

The milled samples of Example 2 (as well as a sample of WC—Co powder as received) were sintered by first pressing about 10 g of each sample into 1.5 cm discs and then heat treating each sample at 1400° C. under flowing argon gas using a heating rate of 10° C./minute and a dwell time of 0.5 hour. After heat treatment, the resultant pellets had shrunk to approximately half of their original sizes, and had densified to varying degrees, up to about 99% density.

The Vicker's hardness values (VHN 300 g) of these samples are shown graphically in FIG. 1. The average hardness of the sample having 0.0 wt. % of boron is about 2135, with the highest values up to 2228. All of these samples are reasonably tough. For example, when measuring conventional WC—Co (which has a VHN of 1200–1600), cracks at the corners of each diamond indentation always appear. No visible cracks at the indents in the nanostructured WC—Co materials appeared in any of the samples examined.

EXAMPLE 4
Solid Diffusion of Precursor into Grain Boundaries (Argon Treatment)

The milled samples of Example 2 having 1 molar % and 10 molar % B in BN were heat treated under argon at 600° C. for 5 hours. The treated powders were then pressed into 1.5 cm pellets, and heat treated at 1400° C. under flowing argon gas using a heating rate of 10° C./minute and a dwell time of 0.5 hour. After heat treatment, the resultant pellets had shrunk to approximately half of their original sizes, and had densified to varying degrees up to about 99% density.

EXAMPLE 5
Solid Diffusion of Precursor into Grain Boundaries (Hydrogen Treatment)

The milled samples of Example 2 having 1 molar % and 10 molar % B in BN were heat treated under hydrogen at 600° C. for 5 hours. The treated powders were then pressed into 1.5 cm pellets, and heat treated at 1400° C. under flowing argon gas using a heating rate of 10° C./minute and a dwell time of 0.5 hour. After heat treatment, the resultant pellets had shrunk to approximately half of their original sizes, and had densified to varying degrees up to about 99% density.

EXAMPLE 6
Solid Diffusion of Precursor into Grain Boundaries (Ammonia Treatment)

The milled samples of Example 2 having 1 molar % and 10 molar % B in BN were heated treated under ammonia at 600° C. for 5 hours. The treated powders were then pressed into 1.5 cm pellets, and heat treated at 1400° C. under flowing argon gas using a heating rate of 10° C./minute and a dwell time of 0.5 hour. After heat treatment, the resultant pellets had shrunk to approximately half of their original sizes, and had densified to varying degrees up to about 99% density.

EXAMPLE 7
Thermal Spray Trials

The milled sample of Example 2 comprising 0.06 wt. % of boron was prepared in large quantity (about 1 lb) for thermal spray trials. The thermal spray trials were carried out with a Metco 9MB arc plasma spray gun. The spray conditions are summarized below.

| Trial No. | Stand off Distance (inches) | Voltage | Arc Current (amps) | Primary Gas Flow (scfm) | Relative Temp. (A/scfm) | Relative Time (inch/scfm) |
|---|---|---|---|---|---|---|
| 1 | 4 | 65 | 450 | 150 | 3.0 | 0.027 |
| 2 | 4 | 65 | 400 | 150 | 2.7 | 0.027 |
| 3 | 4 | 65 | 400 | 150 | 2.7 | 0.027 |
| 9 | 4 | 65 | 400 | 150 | 2.7 | 0.027 |
| 10 | 4 | 65 | 450 | 200 | 2.3 | 0.020 |
| 11 | 2.5 | 65 | 450 | 200 | 2.3 | 0.013 |
| 12 | 4 | 65 | 450 | 250 | 1.8 | 0.016 |
| 13 | 4 | 65 | 450 | 150 | 3.0 | 0.027 |
| 14 | 4 | 65 | 450 | 200 | 2.3 | 0.020 |
| 15 | 4 | 65 | 400 | 200 | 2.0 | 0.020 |
| 16 | 4 | 65 | 600 | 250 | 2.4 | 0.016 |

Physical properties of the thermally sprayed materials are summarized below.

| Trial No. | Relative Wear Resistance | Desirability* | HV300 | HV300 | HV300 | HV300 | HV300 (Average) |
|---|---|---|---|---|---|---|---|
| 1 | 3 | 0.53 | 786 | 1051 | 855 | | 898 |
| 2 | 2 | | | | | | |
| 3 | 9 | 1.00 | 1042 | 829 | 1377 | | 1083 |
| 9 | 8 | 0.79 | 446 | 1215 | 622 | | 761 |
| 10 | 1 | 0.24 | 618 | 836 | 406 | 369 | 557 |
| 11 | 5 | 0.43 | 348 | 427 | 295 | | 357 |
| 12 | 0.05 | 0.04 | 385 | 275 | 267 | | 309 |
| 13 | 6 | 0.61 | 550 | 459 | 715 | 675 | 600 |
| 14 | 5 | 0.48 | 389 | 484 | 496 | | 456 |
| 15 | 8 | 0.65 | 639 | 402 | 499 | | 513 |
| 16 | 1.5 | | | | | | |

*Desirability = [(Structure retained/Maximum structure retained) × (Average thickness/Maximum Average Thickness)]$^{0.05}$ SEM examination indicated that trial No. 3 yielded the material with the best bonding and microstructure. The Vicker's hardness values of these samples in cross-section and perpendicular to the coating were measured, and the results are summarized in FIG. 2. The data in FIG. 2 shows the relationship of coating properties for different plasma conditions in the thermal spray trials. The coating properties include relative wear resistance, hardness and desirability.

EXAMPLE 8
In-situ Synthesis of Nanostructured Powders with Grain Growth Inhibitor An aqueous solution was prepared by dissolving 22.64 g (7.70 mmol) of $(NH_4)_6W_{39}O_{12} \cdot H_2O$ (ammonium metatungstenate), 9.88 g (34 m mol) of $Co(NO2_3)_2 \cdot H_2O$ (cobalt nitrate) and 13.80 g (77 mol) of glucose in 20 mL of water. A volume of aqueous solution comprising 12 mg (0.5 mmol) of BN was added to the above aqueous solution. This reaction mixture was then spray dried to make a W—C—Co—BN pre-composite powder. This precursor powder is then transferred into a high temperature furnace and carburized under a mixture of $H_2$/CO gas using a heating rate of 10° C./min and reaction time of 30 minutes, thereby producing nanostructured WC/Co comprising the BN grain growth inhibitor.

EXAMPLE 9
In-situ Synthesis of Alloyed Nanostructured Powders with Grain Growth Inhibitor An aqueous solution was prepared by dissolving 22.64 g (7.7 mmol) of ammonium metatungstenate, 9.88 g (34 mmol) cobalt nitrite, and 13.80 g (77 mol) glucose in 20 mL of water. A volume of aqueous solution comprising 12 mg (0.5 mmol) of BN polymeric precursor was added to the above aqueous solution. A mixture comprising 0.2 g (3.3 mmol) of TiC, 0.0002 g of Cr and 0.02 g (0.2 mmol) of Mo was then added to make a reaction mixture comprising 0.06 wt % BN, 0.1 wt. % Mo, 0.01 wt. % Cr, and 1 wt. % TiC with respect to WC. This reaction mixture is then spray dried to make a W—C—Co—BN pre-composite powder containing the alloying additives. This precursor powder is then transferred into a high temperature furnace and carburized under a mixture of $H_2$/CO gas using a heating rate of 10° C./min and reaction time of 30 minutes, thereby producing nanostructured WC/Co alloyed with Ti, Cr, and Mo and comprising the BN grain growth inhibitor.

EXAMPLE 10
Alloy additives and BN Grain Growth Inhibitor into Nanostructured WC/Co A series of compositions were prepared using 6 g (0.1 mol) TiC, 0.06 g (1.2 mmol) Cr, 0.6 g (6.3 mmol) Mo, and 29 mL of a 1 molar solution of the BN precursor added to 600 g of nanostructured WC/Co having varying amounts of Co (used as received from Nanodyne) to form compositions having 1 wt. % TiC, 0.01 wt. % Cr, 0.1% Mo, and 0.06 wt. % BN with respect to WC/Co, where the Co varied from 6 to 15 wt. %. The powders were then thoroughly mixed via ball milling to form an intermediate powder composition, followed by either spray drying or oven drying.

One part of the intermediate powder composition was spray dried to form spherical WC/Co composites containing BN grain growth inhibitor and the alloying additives. Such composites are useful either as thermal spray feedstock materials or for bulk consolidation.

Figure 3:
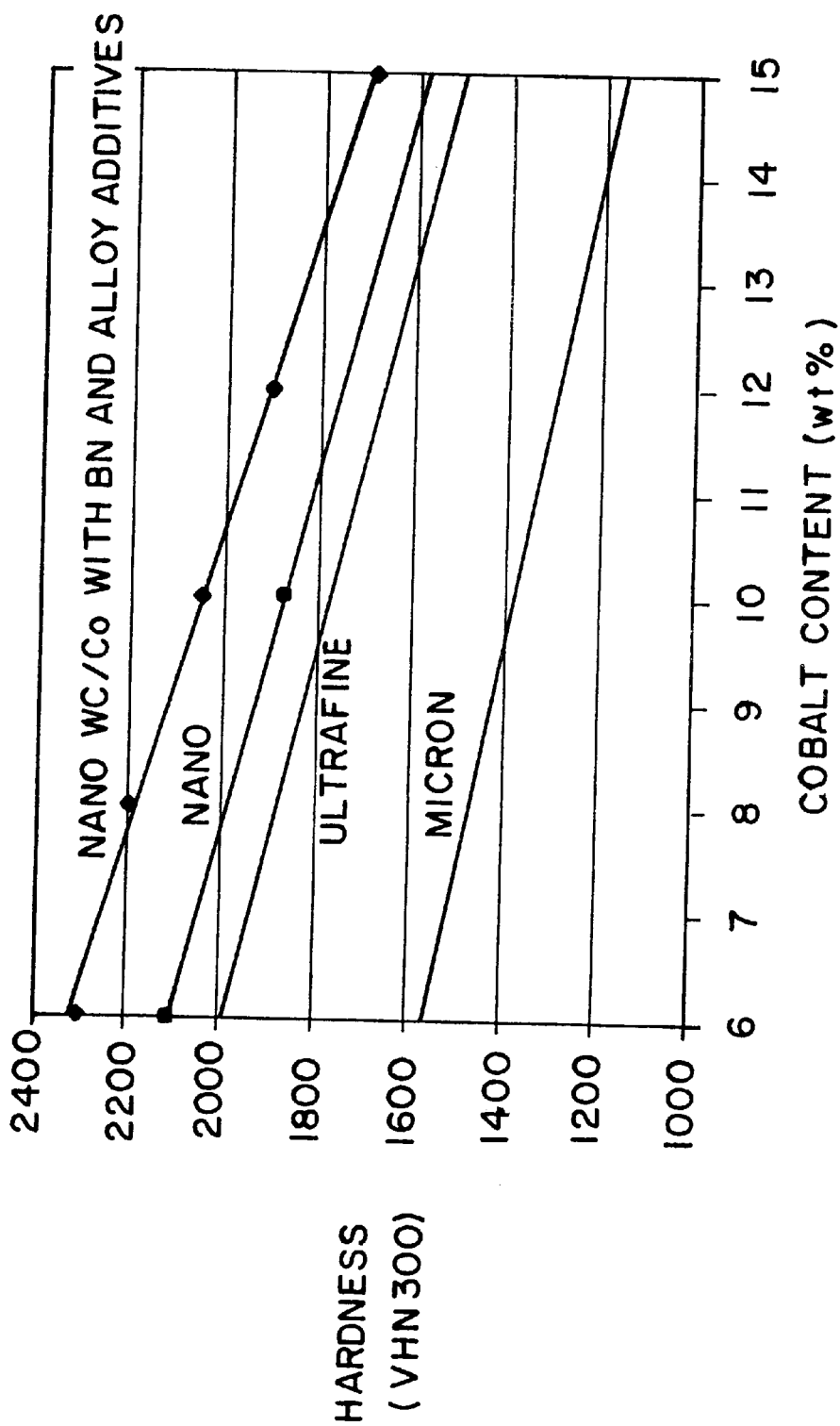
FIG. 3 is a graph illustrating the effect of the toughness as function of alloy addition with 1 wt. % BN grain growth inhibitor.

Another part of the intermediate powder composition was consolidated into 1 cm discs via a hydraulic press, and heat treated at 1400° C. under flowing $H_2$ gas using a heating rate of 10° C./minute and a dwell time of 0.5 hour. After heat treatment, the resultant pellets had shrunk to approximately half of their original sizes, and had densified to varying degrees up to near theoretical or 100% density. The hardness of these WC/Co consolidated pellets comprising BN and Cr and Ti alloying agents varies from 1900 up to 2400 VHN as the wt. % of Co varies from 15 wt. % to 6 wt. %. A comparison of the results of plotting hardness vs. Co content for nanostructured WC/Co containing the grain growth inhibitor and alloy additives, and for nanostructured WC/Co without any alloy additives and/or grain growth inhibitor is shown in FIG. 3.

The toughness of the nanostructured WC/Co containing grain growth inhibitor and alloy additives is also increased relative to WC/Co with no grain growth inhibitor or alloying additives. For example, with no grain growth inhibitor or alloying additives, typical WC—10Co has a toughness of 10–12 (MPa)·(meter½), whereas the toughness of the nanostructured WC/Co containing alloy additives and the polymeric grain growth inhibitor is from 15 to 30 (MPa)·(meter½).

EXAMPLE 11
Alloy Additives and BN Grain Growth Inhibitor into Submicron Sized WC/Co Submicron-sized (0.2 micron) WC and micron-sized (1–5 micron) Co were purchased from Dow Chemical. 6 g (0.1 mol)TiC, 0.06 g (1.2 mmol) Cr, 0.6 g (6.3 mmol) Mo, and 29 mL of an aqueous 1 molar solution of BN precursor was added to 600 g submicron WC/Co, to make compositions having 1 wt. % TiC, 0.01 wt. % Cr, 0.1% Mo, 0.06 wt. % BN with respect to WC/Co, where the Co varies from 6 to 15 wt. %. The powders were then thoroughly mixed via ball milling to produce intermediate powder compositions which were either spray dried or oven dried.

Part of the intermediate powder composition was spray dried to form spherical WC/Co composite containing BN grain growth inhibitor and the alloying additives. Such compositions are useful either as thermal spray feedstock materials or for bulk consolidation.

Part of the intermediate powder was also consolidated into 1 cm discs via a hydraulic press, and heat treated at 1400° C. under flowing $H_2$ gas using a heating rate of 10° C./minute and a dwell time of 0.5 hour. After heat treatment, the resultant pellets had shrunk and had densified to varying degrees up to near theoretical or 100% density. The hardness of the produced pellet comprising WC/Co with alloy and grain growth inhibitor varies from 1600 up to 1900 VHN, as the wt. % of Co varies from 15 wt. % to 6 wt. %.

Conventional alloying techniques have generally comprised blending of micron-sized powders to form a mixture, followed by melting at high temperature to obtain the alloyed material. In contrast, a particularly favorable feature of the present invention is the use of soluble or low-melting grain growth inhibitor precursors and/or alloying additives to obtain uniform mixing with the superfine materials. It is also possible to use these techniques to incorporate controlled quantities of grain growth inhibitors into nanostructured materials, thereby allowing the controlled growth of nanostructured particles to superfine particles.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method of incorporating a grain growth inhibitor into a superfine material, comprising incorporating a grain growth inhibitor polymeric precursor into a composition for the synthesis of a superfine material or superfine intermediate material;

synthesizing the superfine material from the composition having the incorporated precursor to produce a superfine material/precursor composite or a superfine intermediate material/precursor composite; and treating the composite to convert the precursor to a grain growth inhibitor.

2. The method of claim 1, wherein the grain growth inhibitor is boron nitride and the superfine material is WC/Co.

3. The method of claim 2, wherein the grain growth inhibitor polymer precursor is synthesized by treating a mixture of boric acid and urea in water with ammonia.

4. The method of claim 1, wherein synthesizing the superfine material/precursor composite or superfine intermediate material/composite is by aqueous solution reaction, inorganic solution reaction, inert gas condensation, chemical vapor deposition, mechanical alloying, or thermochemical conversion.

5. The method of claim 4, wherein synthesizing is by aqueous solution reaction comprising spray-drying or organic solution reaction comprising spray-drying to form a superfine material intermediate/precursor composite in the form of a powder.

6. The method of claim 5, wherein treating is by heat-treating the powder at a temperature less than the grain growth temperature of the superfine material, thereby partially or fully converting the grain growth inhibitor precursor to the grain growth inhibitor.

7. The method of claim 1, further comprising reducing, carburizing, or nitriding the superfine material intermediate/precursor composite to form the product superfine materials or to convert the grain growth inhibitor precursor to the grain growth inhibitor or a combination thereof.

8. The method of claim 1, wherein treating is by heat-treating the superfine material/precursor composite or the superfine intermediate material/precursor composite at a temperature less than the grain growth temperature of the superfine material or superfine intermediate material, thereby partially or fully converting the grain growth inhibitor precursor to the grain growth inhibitor.

9. The method of claim 1, wherein the superfine material is selected from the group consisting of a metals, metal alloys, metal carbides, metal

17 nitrides, metal ceramics, ceramics, ceramic-ceramic composites, or intermetallic.

10. The method of claim 1, wherein the superfine material is selected from the group consisting of Cu, FeCu, FeCo, NiAl, MoC, MoSi, NiCr, TiC, Mo$_2$Si, NiCr/Cr$_3$C$_2$, Fe/TiC, Ni/TiC, Mo/TiC, WC/Co, the forgoing alloyed with one or more of Ti, Cr, Mo, Ni, Zr, Ce, Fe, Al, Si, V, TiC, Mn, Y, W, and mixtures thereof.

11. The method of claim 1, wherein the superfine material is WC/Co, WC/Co alloyed with at least one of TiC, Mo, Cr, or a combination thereof.

12. The method of claim 1, wherein the grain growth inhibitor is a metal, metal alloy, metal carbide, metal nitride, intermetallic, or ceramic.

13. The method of claim 1, wherein the grain growth inhibitor is selected from the group consisting of B, Si, Al, Cr, Ni, Mo, Hf, Ta, Fe, W, Zr, rare earth metals, Ce, La, Sm, the foregoing alloyed with Cr, TiC, Ti, and Mo or a combination thereof, silicon-based carbides, titanium-based carbides, aluminum-based nitrides, titanium-based nitrides, BN; metal silicides, AlSi, TiSi, metal aluminides, TiAl and titanium diboride.

14. The method of claim 1, wherein the grain growth inhibitor is an inorganic boron compound.

15. The method of claim 1, wherein the grain growth inhibitor is boron nitride.

16. A method of incorporating a grain growth inhibitor into a superfine material, comprising incorporating a grain growth inhibitor polymeric precursor into an already-synthesized superfine intermediate material; and treating the intermediate material to convert the precursor to a grain growth inhibitor.

17. The method of claim 16, wherein the grain growth inhibitor is boron nitride.

18. The method of claim 17, wherein the grain growth inhibitor precursor is synthesized by treating a mixture of boric acid and urea in water with ammonia.

19. The method of claim 16, wherein the grain growth inhibitor is a metal, metal alloy, metal carbide, metal nitride, intermetallic, or ceramic.

20. The method of claim 19, wherein the grain growth inhibitor is is selected from the group consisting of B, Si, Al, Cr, Ni, Mo, Hf, Ta, Fe, W, Zr, rare earth metals, Ce, La, Sm, the foregoing alloyed with Cr, Ti, TiC, and Mo or a combination thereof, silicon-based carbides, titanium-based carbides, aluminum-based nitrides, titanium-based nitrides, BN; metal silicides, AlSi, TiSi, metal aluminides, TiAl and titanium diboride.

21. The method of claim 20, wherein the grain growth inhibitor is an inorganic boron compound.

22. The method of claim 21, wherein the grain growth inhibitor is boron nitride.

23. The method of claim 16, wherein incorporating is by physical mixing of a solution of the grain growth inhibitor precursor and the already-synthesized superfine intermediate material for a length

18 of time effective for the grain growth inhibitor precursor to diffuse into the material.

24. The method of claim 16, wherein incorporating is by heating or melting the grain growth inhibitor precursor onto the already-synthesized superfine intermediate material for a length of time and at a temperature less than the grain growth temperature of the superfine material temperature but effective to promote diffusion of the grain growth inhibitor precursor into the already-synthesized superfine material.

25. The method of claim 24, wherein heating is at a temperature and for a length of time effective to convert the grain growth inhibitor precursor to the grain growth inhibitor simultaneous with diffusion, after diffusion, or a combination thereof.

26. The method of claim 16, wherein incorporating is by milling a solution of grain growth inhibitor precursor with the already-synthesized superfine intermediate material.

27. The method of claim 16, further comprising spray-drying a slurry of the incorporated grain growth inhibitor precursor and the already-synthesized superfine intermediate material prior to heat treating.

28. The method of claim 16, wherein heat treating is in a controlled gas environment at a temperature effective to decompose the grain growth inhibitor precursor to the grain growth inhibitor.

29. The method of claim 16, wherein the incorporating and the treating steps are performed at the same time by heat treatment for a length of time and a temperature effective to convert the grain growth inhibitor precursor into the grain growth inhibitor, and to result in the grain growth inhibitor being diffused substantially onto the grain boundaries of the as-synthesized superfine intermediate material precursor.

30. The method of claim 16, wherein the the grain growth inhibitor is boron nitride.

31. The method of claim 16, wherein the already-synthesized superfine material is WC/Co, and the grain growth inhibitor is boron nitride.

32. The method of claim 1, further comprising incorporating at least one alloying material into the composition for the synthesis of a superfine intermediate material.

33. The method of claim 32, wherein the superfine material is selected from the group consisting of metals, metal alloys, metal carbides, metal nitrides, metal ceramics, ceramics, ceramic-ceramic composites, or intermetallics;

the grain growth inhibitor is selected from the group consisting of metal, metal alloys, metal carbides, metal nitrides, intermetallics, and ceramics.

34. The method of claim 32, wherein the superfine material is selected from the group consisting of Cu, FeCu, FeCo, NiAl,MoC, MoSi, NiCr, TiC, Mo$_2$Si, NiCr/Cr$_3$C$_2$, Fe/TiC, Ni/TiC, Mo/TiC, WC/Co, the forgoing alloyed with one or more of Ti, Cr, Mo, Ni, Zr, Ce, Fe, Al, Si, V, TiC, Mn, Y, W, and mixtures thereof;

the grain growth inhibitor is selected from the group consisting of B, Si, Al, Cr, Ni, Mo, Hf, Ta, Fe, W, Zr, rare earth metals, Ce, La, Sm, the foregoing alloyed with Cr, Ti, TiC, and Mo or a combination thereof, silicon-based carbides, titanium-based carbides, aluminum-based nitrides, titanium-based nitrides, BN; metal silicides, AlSi, TiSi, metal aluminides, TiAl and titanium diboride; and the at least one alloying additive is selected from the group consisting of Ti, Cr, Mo, N, Zr, Ce, Fe, Al, Si, V, TiC, Mn, Y, W, alloys of the foregoing, nitrides of the foregoing, and intermetallics of the foregoing.

35. The method of claim 32, wherein the superfine material is WC/Co, the grain growth inhibitor is BN, and the alloying additive is Cr, TiC, and Mo.

36. The method of claim 16, further comprising incorporating an alloying material into the already-synthesized superfine intermediate material.

37. A method of incorporating a grain growth inhibitor into a superfine material, comprising incorporating a grain growth inhibitor polymeric precursor into a composition for the synthesis of a nanostructured material or nanostructured intermediate material;

synthesizing the superfine material from the composition having the incorporated precursor to produce a nanostructured material/precursor composite or a nanostructured intermediate material/precursor composite;

treating the composite to convert the precursor to a grain growth inhibitor; and treating the nanostructured material or intermediate material to produce a superfine material or intermediate material.

38. A method of incorporating a grain growth inhibitor into a superfine material, comprising incorporating a grain growth inhibitor polymeric precursor into an already-synthesized nanostructured material or nanostructured intermediate material;

treating the nanostructured material or intermediate material to convert the precursor to a grain growth inhibitor; and treating the nanostructured material or intermediate material to produce a superfine material or intermediate material.

39. A method of incorporating a grain growth inhibitor into a superfine material, comprising incorporating a grain growth inhibitor polymeric precursor, synthesized by treating a mixture of boric acid and urea in water with ammonia, into an already-synthesized superfine material; and treating the superfine material or intermediate material to convert the precursor to a grain growth inhibitor.

40. The method of claim 39, wherein the superfine material is selected from the group consisting of a metal, metal alloy, metal carbide, metal nitride, metal ceramic, ceramic, ceramic-ceramic composite, or intermetallic.

41. The method of claim 39, wherein the superfine material is selected from the group consisting of Cu, FeCu, FeCo, NiAl, MoC, MoSi, NiCr, TiC, $Mo_2Si$, $NiCr/Cr_3C_2$, Fe/TiC, Ni/TiC, Mo/TiC, WC/Co, the forgoing alloyed with one or more of Ti, Cr, Mo, Ni, Zr, Ce, Fe, Al, Si, V, TiC, Mn, Y, W, and mixtures thereof.

42. The method of claim 39, wherein the superfine material is WC/Co, WC/Co alloyed with at least one of TiC, Mo, Cr, or a combination thereof.

43. The method of claim 39, wherein incorporating is by physical mixing of a solution of the grain growth inhibitor precursor and the already-synthesized superfine material for a length of time effective for the grain growth inhibitor precursor to diffuse into the material.

44. The method of claim 39, wherein incorporating is by heating or melting the grain growth inhibitor precursor onto the already-synthesized superfine material for a length of time and at a temperature less than the grain growth temperature of the superfine material temperature but effective to promote diffusion of the grain growth inhibitor precursor into the already-synthesized superfine material.

45. The method of claim 44, wherein heating is at a temperature and for a length of time effective to convert the grain growth inhibitor precursor to the grain growth inhibitor simultaneous with diffusion, after diffusion, or a combination thereof.

46. The method of claim 39, wherein incorporating is by milling a solution of grain growth inhibitor precursor with the already-synthesized superfine material.

47. The method of claims 39, further comprising spray-drying a slurry of the incorporated grain growth inhibitor precursor and the already-synthesized superfine material prior to treating.

48. The method claim 39, wherein treating is heat treating is in a controlled gas environment at a temperature effective to decompose the grain growth inhibitor precursor to the grain growth inhibitor.

49. The method of claim 39, wherein the incorporating and the treating steps are performed at the same time by heat treatment for a length of time and a temperature effective to convert the grain growth inhibitor precursor into the grain growth inhibitor, and to result in the grain growth inhibitor being diffused substantially onto the grain boundaries of the as-synthesized superfine material.

50. The method of claim 39, further comprising incorporating an alloying material into the already-synthesized superfine material or superfine intermediate material.

51. The method of claim 50, wherein the superfine material is selected from the group consisting of metals, metal alloys, metal carbides, metal nitrides, metal ceramics, ceramics, ceramic-ceramic composites, or intermetallics.

52. The method of claim 50, wherein the superfine material is selected from the group consisting of Cu, FeCu, FeCo, NiAl, MoC, MoSi, NiCr, TiC, $Mo_2Si$, $NiCr/Cr_3C_2$, Fe/TiC, Ni/TiC, Mo/TiC, WC/Co, the forgoing alloyed with one or more of Ti, Cr, Mo, Ni, Zr, Ce, Fe, Al, Si, V, TiC, Mn, Y, W, and mixtures thereof, and the at least one alloying additive is selected from the group consisting of Ti, Cr, Mo, N, Zr, Ce, Fe, Al, Si, V, TiC, Mn, Y, W, alloys of the foregoing, nitrides of the foregoing, and intermetallics of the foregoing.

53. The method of claim 50, wherein the superfine material is WC/Co, and the alloying additive is at least one of Cr, TiC, and Mo.

* * * * *